INVENTOR.
VERNON S. SORENSON
BY
George C. Sullivan
Agent

United States Patent Office 3,736,202
Patented May 29, 1973

3,736,202
COMPOSITE SHEETS AND PROCESSES OF MANUFACTURING THE SAME
Vernon S. Sorenson, Valencia, Calif., assignor to Lockheed Aircraft Corporation, Burbank, Calif.
Continuation-in-part of application Ser. No. 507,806, Nov. 15, 1965. This application Jan. 22, 1970, Ser. No. 5,120
Int. Cl. B65h *81/02*
U.S. Cl. 156—172                7 Claims

ABSTRACT OF THE DISCLOSURE

A method of manufacturing composite sheets for structural fabrication wherein a lamina of unpolymerized resin is heated sufficiently to cause it to become tacky, but below its polymerization temperature; monofilament strands are layed up on the tacky lamina and thereafter the composite sheet is heated under pressure to yield a polymerized composite in which the strands are coated and bonded to the sheet.

RELATED APPLICATIONS

This application is a continuation-in-part of application Ser. No. 507,806, filed Nov. 15, 1965, entitled, "Composite Sheets and Processes of Manufacturing the Same," now abandoned.

BACKGROUND OF THE INVENTION

At the present time, it is widely recognized that composite or laminate structures composed of strands of one or more materials bonded together by a polymerized polymer composition having different properties than the strands possess a number of important physical characteristics. These characteristics are considered to make such composite or laminate structures extremely desirable for use in many different applications. It is considered that the art with respect to the manufacture of such composite or laminate structures has not advanced to a point where structures of this type can be easily and conveniently created in such a manner that these structures uniformly have ultimate or theoretical physical characteristics, and in particular satisfactory compression strengths.

For an understanding of this invention, it is not necessary to indicate in detail all of the various different manufacturing techniques and methods which have been used to create various composite or laminate structures of the type indicated. These techniques have included various spraying procedures, various winding procedures, various hand layup methods and the like. In all of these techniques the operative steps have been intended so as to place the strands used in an intended position along with a polymer composition, and then to cause polymerization of the polymer composition in order to bind the various strands together.

As the art in this field has developed it has been recognized that the final properties of a composite or laminate structure are dependent upon not only the properties of the specific strands utilized, the sizes of these strands and the polymer composition employed, but are dependent upon numerous other factors. One of these is that most desirable properties are achieved when a structure is substantially void-free. Another is that the properties which are most desirable are present when the quantity of the polymer used is adequate to coat substantially all of the strands so that they are all held together directly by the polymer without being present in any significant excess over this amount. Another important consideration is that the strands themselves should be oriented with respect to one another so as to obtain the most desirable structural characteristics.

As a result of these factors, a number of efforts have been directed toward the production of composite sheets for use in manufacturing so-called composite or laminate structures of the type indicated. In certain of these prior art structures individual strands of materials such as fiber glass threads are coated with a liquid polymer composition capable of being further polymerized and are located next to one another so that the polymer composition in effect binds the strands to one another. Because of the fact that a composite sheet of this type relies for temporary bonding upon an incompletely polymerized material, a structure of this type is considered to be relatively difficult to handle in preparing a final composite structure. This is because a sheet structure of this type may have a definite tendency to break apart between the strands.

In the type of composite sheet structure indicated in the preceding paragraph and in other prior structures of a similar character another problem has been encountered. This is the problem of obtaining adequate flow of the polymer composition during the curing cycle of the polymer so that substantially all of the strands are completely coated by the final polymerized composition, and so that a substantially void-free structure results. To a significant degree it is considered that in most cases this problem has been a result of a failure to consider that once a polymer composition has reached a so-called gel state, it does not flow satisfactorily so as to wet surfaces and fill voids in a desired manner necessary to achieve what may be loosely referred to as "ultimate" properties.

This can be illustrated by referring to the manners in which such composite sheet structures are used in creating composite or laminate structures. These sheets may be cut to desired shapes or configurations and laid upon one another, as upon a supporting mold or surface. Once in such a position they can be subjected to heat alone so as to cause polymerization of the polymer composition in them. During such polymerization the polymer composition on one of such sheets of course bonds to the next of such sheets and so on in order to secure the strands to one another. Because of the character of a polymer composition during polymerization and the recognized desire for a coherent, substantially void-free structure it is conventional to use pressure and/or a vacuum as such polymerization is being caused in an effort to force the sheets into contact with one another and to remove as much gas or air as possible from between the sheets. Because of the inherent character of a polymer composition which has been polymerized to or past the gel state, it is considered substantially impossible to completely achieve these objectives, and in particular to eliminate substantially all vestiges of voids from between the sheets.

An object of the present invention is to provide new and improved composite sheets for use as intermediate materials in the manufacture of laminate or composite structures. A more specific object of this invention is to provide sheets of the type indicated which may be easily and conveniently utilized in the manufacture of laminate or composite structures because of their strength characteristics and because of the character of the polymer composition used in them. Another object of this invention is to provide composite sheets of the type indicated which can be used with virtually any type of reinforcing filament and which may be easily and conveniently varied so as to obtain a desired ratio of polymer composition to the amount of the filament material used for any specific design purpose.

A further object of this invention is to provide methods for easily and conveniently manufacturing sheet structures of the type indicated in the preceding paragraph. A still further object of this invention is to provide methods for this purpose which may be carried out at a minimum expenditure, and which are very efficient for the purposes intended. A related object of the invention is to provide methods of the type indicated which may be varied so as to produce different structures as may be required for any intended design application.

These and various other objects of this invention will be more fully apparent from a detailed consideration of the remainder of this specification, the appended claims, and the accompanying drawings.

DESCRIPTION OF THE PREFERRED EMBODIMENTS

Figure 1:
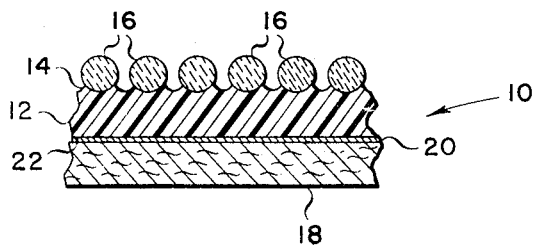
FIG. 1 is a cross-sectional view of a presently preferred embodiment or form of a composite sheet of this invention.

Those skilled in the manufacture of composite sheets which are to be used in the manufacture of laminate or composite structures will realize that FIG. 1 of the drawing is primarily intended for explanatory purposes in explaining the nature of a presently preferred embodiment or form of a composite sheet of this invention, that this figure does not show any precise composite sheet drawn to scale, and that changes of a routine engineering nature may be made in the sheet illustrated. Such individuals will also realize that the methods herein explained and illustrated in the accompanying drawing for producing composite sheets of this invention may be modified in accordance with routine engineering skill in almost an infinite variety of ways.

As an aid to understanding this invention it can be stated in essentially summary form that it concerns composite sheets for use in preparing laminate or composite structures, each of these sheets including: a sheet of a polymer composition, the viscosity of which composition is such that the sheet is self-supporting within normal ambient temperatures, this composition within the sheet initially being of an ungelled character; and a plurality of reinforcing filaments located on the sheet, these filaments being attached to the sheet by physical adhesion between the polymer composition and the portions of the filaments contacting the sheet. Preferably, the filaments comprise so-called "monofilaments" which are disposed parallel to one another and the entire sheet includes another sheet of the so-called backing character as it is being handled prior to being used. This invention also includes processes for manufacturing such composite sheets which involve bringing filaments into contact with polymer sheets as indicated under temperature conditions such that desired adhesion to the filaments is achieved without gellation, or at least measurable gellation of the polymer composition under moderate pressure insufficient to imbed such filaments within the sheets to an extent which will not materially affect the strength of such polymer sheets.

The actual details of this invention are best more fully explained by referring to FIG. 1 of the drawing. Here there is shown a composite sheet 10 of this invention which includes a polymer matrix or lamina 12 upon a surface 14 of which there are located a plurality of filaments 16. By "filament" is meant a single element of the type comprising a textile fiber. Preferably, these filaments 16 are spaced apart from one another by a distance sufficient to permit the polymer composition to flow from the lamina 12 between them to just a sufficient extent to adequately coat or cover the surfaces of these filaments 16 during use or fabrication of a structure from sheet 10. Preferably, but not necessarily, this composite sheet 10 includes a backing or release layer 18 of a conventional type. This layer 18 may be provided with a coating 20 of a release material designed to release a surface 22 of the polymer lamina 12 prior to when the composite sheet 10 is to be used to create a laminate or composite structure.

The polymer lamina 12 employed with this invention should be a film matrix of an ungelled polymer composition, the viscosity of which is such that at normal ambient temperatures the film or sheet itself is normally self-supporting and is capable of being handled without being easily broken or torn. Such temperatures are considered to be within the range of from 0° F. to 120° F. Obviously, if a specific polymer lamina is to be normally employed within a more restricted range of ambient temperatures it is only necessary that the lamina have the desired physical properties within such a range. These physical properties desired for the polymer lamina 12 are roughly comparable to the physical properties possessed by a sheet of comparatively thin paper or comparatively thin film of a polymerized resin.

The polymer lamina 12 can be compounded so as to have such physical properties out of virtually any ungelled polymer composition capable of bonding to the particular filaments employed in the composite sheet 10 of this invention. That is, the resin matrix comprising lamina 12 may be either an unpolymerized material or a partially polymerized thermosetting material. In either case it must be semi-solid and drapeable. Among the various polymer systems which can be used in creating a polymer lamina 12 having desired properties are polymer systems based upon various polyesters, epoxies, silicones, polyamides, polyimides, phenolics, and various related polymers. Blends of various polymer compositions can of course also be employed.

The prime characteristic or property of the resin matrix or polymer lamina 12 which is necessary in the invention, is that the resin must be capable of forming a semi-solid, drapeable film which upon heating will soften and flow in a liquid state before finally polymerizing to form a solid resin matrix. Preferably there should be an absence of volatiles in the resin matrix.

These laminae may, and normally should, also contain proportions of at least one catalyst, and if applicable to the particular polymer system employed, at least one accelerator, such a catalyst and/or accelerator being of a type which will not cause polymerization or gellation at ambient temperature or within a reasonable temperature above ambient temperature such as for example 70° F. above ambient temperature. The polymer lamina 12 may also contain minor amounts of various secondary ingredients designed to alter polymer or polymerization characteristics. All of such ingredients are considered to be of a known type falling within the knowledge of those familiar with polymer chemistry.

Those familiar with the compounding of polymer chemistry will realize that such a matrix of an ungelled polymer composition can easily be compounded and created through the use of routine compounding and manufacturing skill in accordance with various known techniques. As is well known to those versed in the art, certain resins, such as the base-catalyzed condensation of phenol with formaldehyde, goes through three more or less distinct stages designated A (resol), B (resitol) and C (resite). The A-stage resin is thermoplastic and completely soluble in alcohol, and the B-stage resin softens but does not melt on heating and swells without dissolving in alcohol. The fully cured C-stage resin is thermosetting and completely insoluble in all solvents. In the present invention an A- or B-stage resin, or a blend thereof may be employed, and thereafter cured to a C-stage by means of either heat or a catalyst, or both. In certain cases a lamina may be created directly from a polymer composition of an ungelled character, that is a B-stage resin, without blending various different polymer compositions together. Thus, for example, a satisfactory lamina such as the lamina 12 can be created using a modified epoxy resin composition containing an internal catalyst sold under the number BP911 by the American Cyanamid Company, Plastics and Resins Division, New York, N.Y. A suitable composition may also be prepared by heating to its melting point a solid epoxy resin such as the resin sold as Epon 1001 by the Shell Chemical Company, New York, N.Y., and adding to it while in the molten state the epoxy resin sold by the same form as Epon 828, and by adding to the liquid mixture resulting conventional proportions of a catalyst or accelerator. Such a liquid composition may be cast into a thin layer such as the polymer lamina 12.

An example of a resin formulation which can be utilized for constructing a lamina of resin suitable for accepting the lay up of filaments thereon while in an unpolymerized state can be formulated as follows:

| | Parts by weight |
|---|---|
| Epon 1031 | 50 |
| Epon 828 | 50 |
| Methyl nadic anhydride | 90 |
| Benzyl dimethyl | 0.5 |

The formulation is heated at a temperature approaching 150° F. until its viscosity at 70° F. exceeds 100,000 centipoises. The film or resin matrix is then cooled and stored on a Teflon-coated release paper at a temperature below 40° F. Both Epon 1031 and Epon 828 are products of the Shell Chemical Company of New York. A description of Epon 828 and Epon 1001 may be found in U.S. Pat. 3,249,587 together with a description of a suitable catalyst for accomplishing the process of making a resin matrix of the type used in the present invention. Obviously, while the above formulation will work acceptably, a number of other formulaions can also be utilized in order to obtain different properties and effects.

It is to be noted that in forming a polymer sheet, such as the polymer lamina 12, care should be taken so as to avoid excessive heating of the polymer composition used, or otherwise treating the polymer composition used in such a manner as to cause its gellation. This is because of the rheological or flow characteristics desired from the polymer sheet during the use of the composite sheet 10. Such gellation is defined in many different ways. Briefly, such gellatin involves the formation of a semi-rigid dispersion (e.g., B-stage polymer composition) within a substantially liquid (e.g., A-stage polymer) composition, the first being insoluble in the second.

A conventional definition of such gellations is found on pages 253 to 255 of the "Textbook of Polymer Sciences," by Billmeyer, published by Interscience Publishers, New York, N.Y., copyright 1962. The entire disclosures of these pages of this text are incorporated herein by reference. This text also gives many details as to polymer systems which may be employed in forming a polymer layer such as the lamina 12. Such details are, of course, also to be found in a number of other texts such as the text "Epoxy Resins," by Lee and Neville, published by McGraw-Hill Book Company, New York, N.Y., 1957.

The filaments 16 used in the composite sheet 10 may be of any type employed in so-called composite or laminate structures. Thus within the broad concepts of this invention, these filaments may be organic or inorganic materials in the form of filaments, strands or threads such as cotton, fiber glass threads or the like. However, it is preferred that with this invention that the filaments 16 be of a monofilament type because such monofilaments possess superior properties for most known applications in a final laminate structure as compared to the properties achieved using a thread or similar type of strand. A suitable monofilament, having a diameter of 0.0035 inch, is identified as "S" glass composition HTS finish, manufactured by Owens Corning Fiberglas Corporation.

Presently it is preferred to use with this invention so-called glass monofilaments as the filaments 16 because of cost considerations. However, monofilaments of the type referred to as amorphous boron monofilaments, silicon carbide monofilaments, carbon monofilaments, graphite monofilaments, boride monofilaments and the like may be employed. Wires of any desired metal may also be used. Those familiar with such filaments will realize a certain number of these classes of filaments are not monofilaments in a true sense of the term, but involve filaments in which one material is located upon the surface of another matrix material.

All of the filaments 16 which can be employed with the invention may contain on their surfaces a very thin layer of a known composition serving to either improve the properties of such filaments and/or to aid in their adhesion to a specific polymer composition to be employed with them. In general the presence of any material upon a filament 16 other than a material causing or improving adhesion is to be avoided to as great an extent as reasonably possible so that the final structure produced from the composite sheet 10 will have as good properties as possible. For certain applications it may be desired by a designer that a plurality of different types of filaments 16 be used in a single composite sheet 10 of this invention.

Preferably, these filaments 16 are disposed on lamina 12 so as to be parallel to one another. This enables a composite sheet 10 to be used in conjunction with other of the sheets 10 so that various filaments 16 in different of the sheets are oriented in different manners in order to achieve desired structural characteristics. Such uniform parallel spacing also permits the filaments 16 to be disposed so that in use some of the polymer composition from the polymer lamina 12 will flow so as to coat such filaments substantially completely, avoiding a loss of properties such as would occur if the filaments 16 were in direct contact with one another, as for example by being crossed, so that the polymer composition could not otherwise get between these strands. As indicated in the preceding, such spacing is preferably controlled so that the filaments are no further from one another than is necessary to permit the polymer composition from being present between them in an amount required to obtain substantially complete wetting and bonding of the filaments 16.

The dimensions of the filaments 16 may be varied between comparatively wide limits. It is considered that if monofilaments are used as the filaments 16 and that if they are larger than about 10-mil in diameter that these filaments are so stiff that a composite sheet 10 formed using them will be insufficiently flexible to permit such a sheet to be used for many practical applications. Those skilled in the art will, however, recognize that if monofilaments used as the filaments 16 are unnecessarily small that the strengths of these filaments are on a comparative basis is too low for practical inclusion within a composite or laminate structure having properties of a type normally desired for structural reasons. Because of this it is presently preferred to utilize with the invention as the filaments 16 monofilaments having a diameter from about 3 to about 5 mil. Monofilaments having diameters within this range are sufficiently flexible for use in a composite sheet 10 for most application purposes, and yet are sufficiently strong so as to possess desired strength characteristics for structural purposes.

With glass monofilaments having diameters as indicated in the above preferred range as filaments 16 polymer laminae 12 have been used which are of such a thickness as to contain from about 0.1 to about 0.25 pound of a polymer per square foot of surface area. Although the densities of various polymer compositions will differ slightly this manner of expressing sheet thickness is considered to be sufficiently accurate for use in indicating a preferred manner of practising this invention.

The backing sheet or release layer 18 employed with the composite sheet 10 is normally only employed so as to facilitate handling of the remainder of this composite sheet 10 without danger of damage or breakage to the remainder of the composite sheet 10. The release layer 18 may be of any known variety commonly used for decals, for various types of common adhesively coated signs or stickers or the like. A suitable layer 18 may comprise a paper sheet having a coating 20 of polyethylene. In most applications similar wax or wax-like coatings can be employed as the coating 20. The backing layer 18 may also be a conventional film of a polymer such as polyethylene. If desired the polymer lamina 12 can be created by known techniques directly upon such a backing sheet.

Figure 2:
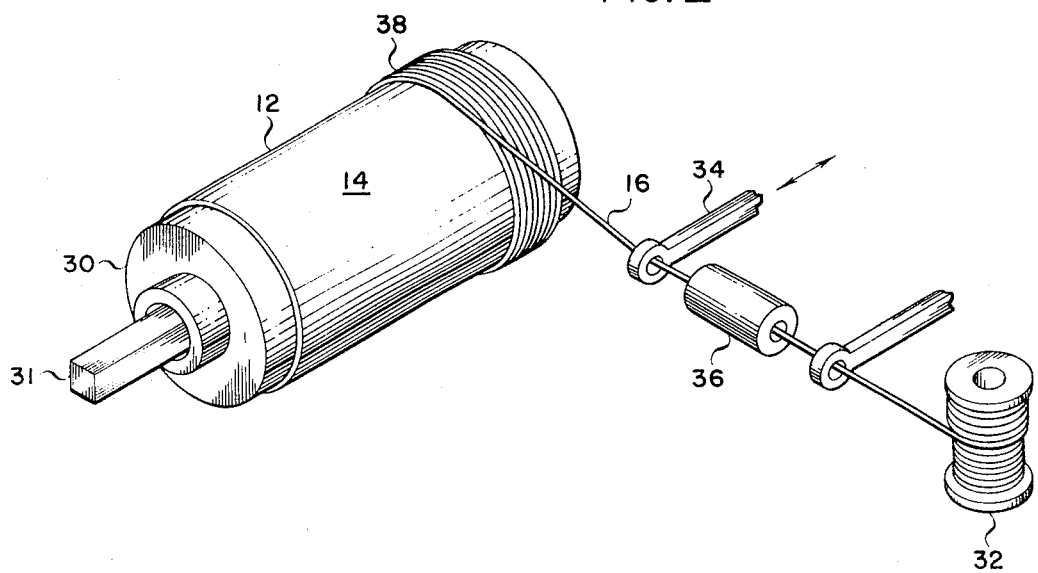
FIG. 2 is a diagrammatic view showing one method of manufacturing a composite sheet structure of this invention.

One method of manufacturing a composite sheet 10 of this invention is diagrammatically illustrated in FIG. 2 of the drawing. Here there is shown a drum 30 which is rotatably mounted in a conventional manner (not shown), and which preferably contains a conventional thermostatically controlled internal heating element 31 capable of uniformly heating its periphery. In the creation of the composite sheet 10 a polymer lamina 12 either with or without a backing layer 18 is secured to the external periphery of the drum 30. Then a filament 16 is wound from a spool 32 in a single layer onto the drum 30 after having been passed through a conventional guide 34. Preferably, as it is being wound the filament 16 is passed through a conventional thermostatically controlled heating chamber 36. The guide 34 is operated so as to create a winding 38 in which the filament 16 is located in what for all practical purposes amounts to a parallel series of filaments extending around the drum 30.

The control of heat during these operations is considered to be important. Heat can be applied by operating the heating element 31 within the drum 30 or by passing the filament 16 through the heater 36, or both as is preferable with this invention. However, care must be taken that the polymer lamina 12 is not heated with heat from all sources to the gel point of the polymer composition present within the lamina 12. However, sufficient heat must be present at the surface 14 so that this surface of the polymer lamina 12 is melted to a sufficient extent so that adequate physical adhesion is created between the filament 16 and the lamina 12 to hold the filament 16 in place upon the lamina 12 so that the composite sheet 10 may be handled and used without coming apart.

The application of a comparatively small amount of tension on the filaments 16 during the winding process will aid in accomplishing such physical adhesion. However, the amount of such tension should be carefully controlled in practising the process herein explained so that the filament 16 does not become embedded to any significant degree within the surface 14 of the lamina 12 since if this would happen it would tend to detrimentally affect the physical properties of the lamina 12 which are important in the handling and use of the composite sheet 10. It is presently considered that in general the tension should be minimal or taken so that the filaments 16 are not forced into the polymer lamina 12 more than about 10 percent of the thickness of this polymer lamina if the desired properties are to be retained in it.

It will be recognized that this 10 percent value is an empirical value which will vary with various factors which may also be varied with this invention such as the nature of the filaments 16, the polymer composition employed in the polymer lamina 12, the temperatures used and the like. It will also be recognized that the temperature necessary to accomplish limited melting or flow at the surface of the polymer lamina 12 in order to bond to filaments 16 by physical adhesion will vary depending upon the nature of the specific polymer composition used. For this reason, it is considered impossible to give in this specification a specific value for this temperature which will be applicable to all of the polymer systems capable of being used with this invention. With the modified epoxy resin identified as number BP911 in the preceding portions of this specification in general the combined heat from all sources present at the interface between a filament 16 being applied and the surface of the polymer lamina 12 should be within the range of 105°–200° F. in order to accomplish an adequate holding of the filament 16 in place. These temperatures can be used with only sufficient pressure applied to a filament 16 in a winding apparatus of the type described to insure accurate winding of the filament 16.

In the method illustrated in FIG. 2, after the filament 16 has been wound along the length of the drum 30 the winding process is, of course, stopped. At this point the wound cylindrical structure created on the surface of the drum 30 can be slit longitudinally and removed from it so as to be able to obtain a composite sheet of the type of the sheet 10. If no backing sheet, such as the backing layer 18, has been present upon the drum 30 during the winding, such a backing sheet can at this point be located upon the polymer lamina 12.

Figure 3:
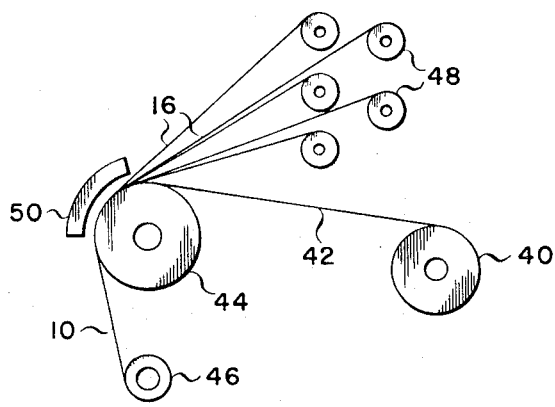
FIG. 3 is a similar diagrammatic view of a further method of manufacturing a composite sheet of this invention.

Another method of manufacturing a composite sheet 10 of this invention is diagrammatically illustrated in FIG. 3 of the drawing. In this manner of practising the invention a roll 40 of a laminated composite structure 42 consisting of a backing sheet corresponding to the backing layer 18 previously described and a polymer sheet corresponding to the polymer lamina 12 previously described is used. This composite structure 42 passes from the roll 40 so that it extends part of the way around a conventional rotatably mounted roller 44 and to a take-up roll 46 of a conventional character. As the composite structure 42 passes around the roller 44 it is brought into contact with a plurality of filaments 16 supplied from conventional spools 48. These filaments 16 engage the structure 42 so as to pass around the roller 44 with the composite sheet 42 parallel to each other.

As the filaments 16 pass in this manner they and the exposed surface of the composite structure 42 are heated by a conventional radiant heater 50 to a sufficient extent so as to cause physical adhesion of the filaments 16 to the composite structure 42. For this purpose the spools 48 are preferably held under a minimal amount of tension by conventional means (not shown). As the method is practised in this manner a continuous roll of a composite sheet such as the sheet 10 accumulates upon the take-up roll 46.

The temperatures derived from the radiant heater 50 should be sufficient to cause bonding by melting at the surface of the roll 44 without causing gellation of the polymer composition used. Similarly, the pressure applied to the filaments 16 should be as indicated in connection with the preceding method so as to avoid the filaments 16 being embedded within the polymer sheet more than the amount indicated in the preceding discussion. If desired, of course, the filaments 16 and the roller 44 may be heated in the same manner as in the preceding method.

Once a composite sheet 10 has been created it can be utilized in essentially the same manner as various prior related sheets. Briefly, such use involves laying up the sheets so that the filaments 16 in successive layers are located remote from one another and applying sufficient heat to such a multi-layer structure so as to cause the polymer composition to melt or otherwise flow and then to change to a completely gelled polymer or polymerized composition. Because of the fact that the polymer composition used with this invention has not been reacted so as to be gelled prior to such use during such heating the viscosity of the composition will decrease to such a point that it will flow relatively readily in order to coat all of the filaments present so as to bond them together into the final structure.

Preferably, such heating during the use of composite sheets is carried out under conditions which tend to remove any gas or air which would be trapped between such sheets and which will tend to squeeze out from the composite or laminate structure being produced any excess resin or polymer unnecessary to obtain desired strength characteristics in the composite or laminate structure being produced. Any of the various means for accomplishing these objectives known to the art may be employed for this purpose.

A final composite or laminate structure produced in these manners is considered to be desirable because of its physical properties. Such desirable physical properties are especially apparent when the filament 16 used in composite sheets of this invention are monofilaments, and these filaments in successive sheets employed in creating a composite or laminate structure are oriented with respect to one another in order to obtain maximum strength characteristics. The compression strengths of composite or laminate structures produced as herein indicated are considered to be particularly satisfactory.

Because of the nature of this invention it is to be considered as being limited solely by the appended claims forming a part of this specification.

What is claimed is:

1. A method of preparing a composite sheet for use in preparing laminate structures comprising the steps of:
    forming a semi-solid, drapeable, film matrix consisting of a sheet of polymerizable resin, the viscosity of which is such that said sheet is self-supporting in the ambient temperature range from 0° F. to 120° F. and wherein said sheet is capable of being converted to a softened state, upon heating to a given temperature above said ambient temperature range, prior to reaching a C-stage cure state;
    heating said film matrix to said softened state;
    applying a plurality of monofilaments in a substantially parallel and closely spaced apart relationship to the surface of said heated and softened polymerizable film matrix and substantially over the entire area thereof so as to cause said monofilaments to be imbedded in said matrix to a depth which is less than 10 percent of the thickness of said film matrix; and
    thereafter cooling said combination of sheet and monofilaments to its self-supporting state.

2. A method as defined in claim 1 wherein said heat is supplied by heating said sheet below the gellation temperature of said resin composition.

3. A method as defined in claim 1 wherein said heat is supplied by heating said monofilament prior to said monofilament contacting said surface and by heating said sheet below the gellation temperature of said resin composition.

4. A method as defined in claim 1 in which said sheet is located upon a roller and in which said monofilament is wound upon said sheet.

5. A method of preparing a composite sheet for use in preparing laminate structures which includes the steps of:
    placing a sheet consisting of a polymerizable resin composition upon the surface of a roller, the viscosity of said resin composition being such that said sheet is self-supporting at ambient temperatures in the range from 0° F. to 120° F;
    winding a heated monofilament over substantially the entire exposed surface of said sheet while simultaneously supplying heat to said sheet, the total heat supplied to said sheet being below that which would result in C-stage polymerization of the resin composition.

6. A method of constructing a composite sheet comprising the steps of:
    heating a portion of the surface of a polymerizable sheet consisting of a partially gelled resin sufficiently to cause said portion of said sheet to become tacky without causing polymerization,
    placing a pattern of monofilaments upon said tacky portion of said sheet for attachment thereto, over substantially the entire surface thereof,
    thereafter cooling said sheet sufficiently to cause physical adhesion between said sheet and said monofilament, and thereafter
    heating said sheet to a temperature greater than the polymerization temperature of said sheet thereby causing said resin composition to flow and substantially coat said monofilament.

7. A method as defined in claim 6 wherein a plurality of monofilaments are located upon the surface of said sheet of partially gelled resin composition, said monofilaments being in substantially parallel juxtaposition having a space therebetween sufficient to permit restrictive flow of said resin composition between said monofilaments during the final heating.

References Cited

UNITED STATES PATENTS

| | | | |
|---|---|---|---|
| 3,034,941 | 5/1962 | Hessenthaler et al. | 161—143 |
| 3,113,061 | 12/1963 | Donaldson | 161—143 X |
| 2,657,157 | 10/1953 | Francis, Jr. | 161—143 |
| 2,640,796 | 6/1953 | Langer | 156—322 X |
| 3,262,826 | 7/1966 | Balkin et al. | 156—172 X |
| 3,294,607 | 12/1966 | Rothermal et al. | 156—275 X |
| 2,523,022 | 9/1950 | Horstman | 161—143 X |

FOREIGN PATENTS

| | | | |
|---|---|---|---|
| 1,039,356 | 9/1958 | Germany | 156—166 |

CARL D. QUARFORTH, Primary Examiner

E. E. LEHMANN, Assistant Examiner

U.S. Cl. X.R.

156—174, 298, 306, 321, 322; 161—78, 143